(12) United States Patent
Schütz et al.

(10) Patent No.: US 9,866,736 B2
(45) Date of Patent: Jan. 9, 2018

(54) DEVICE HAVING A CAMERA UNIT AND A DOUBLE-WALLED HOUSING

(71) Applicant: HUF HULSBECK & FURST GMBH & CO. KG, Velbert (DE)

(72) Inventors: Heiko Schütz, Velbert (DE); Gerd Buschmann, Velbert (DE)

(73) Assignee: HUF HULSBECK & FURST GMBH & CO. KG, Velbert (DE)

( * ) Notice: Subject to any disclaimer, the term of this patent is extended or adjusted under 35 U.S.C. 154(b) by 165 days.

(21) Appl. No.: 14/785,440

(22) PCT Filed: Feb. 26, 2014

(86) PCT No.: PCT/EP2014/053767
§ 371 (c)(1),
(2) Date: Oct. 19, 2015

(87) PCT Pub. No.: WO2014/170055
PCT Pub. Date: Oct. 23, 2014

(65) Prior Publication Data
US 2016/0072987 A1    Mar. 10, 2016

(30) Foreign Application Priority Data

Apr. 18, 2013    (DE) .................. 10 2013 103 930

(51) Int. Cl.
*H04N 5/225*    (2006.01)
*B60R 11/04*    (2006.01)
*B60R 11/00*    (2006.01)

(52) U.S. Cl.
CPC ........... *H04N 5/2252* (2013.01); *B60R 11/04* (2013.01); *B60R 2011/004* (2013.01); *B60R 2011/0094* (2013.01)

(58) Field of Classification Search
CPC .................. H04N 5/2252; B60R 11/04; B60R 2011/0094; B60R 2011/004
See application file for complete search history.

(56) References Cited

U.S. PATENT DOCUMENTS

2004/0114039 A1*    6/2004   Ishikura .................... B60R 1/00
                                                              348/148
2004/0130622 A1*    7/2004   Lang ....................... B60R 11/04
                                                              348/148

(Continued)

FOREIGN PATENT DOCUMENTS

WO        2004012962 A2    2/2004

*Primary Examiner* — Christopher S Kelley
*Assistant Examiner* — Nasim Nirjhar
(74) *Attorney, Agent, or Firm* — Porzio Bromberg and Newman PC (57) ABSTRACT

The invention relates to a device, comprising a camera unit (7), which is used to record images of the outside region (2) of a motor vehicle (3), a housing (10, 20), in which the camera unit (7) is movably arranged, and a protective element (4), which can be moved between an open position (5) and a closed position (6), wherein the camera unit (7)assumes an idle position (60) in the closed position (6) of the protective element (4), in which idle position the camera unit (7) is located behind the protective element (4) and thus is inaccessible from the outside region (2), and the camera unit (7) is located in the active position (61) for recording images in the open position (5) of the protective element (4). According to the invention, the housing (10, 20) is double-walled at least in some regions in such a way that the housing (10, 20) has an inner wall (13) having at least one opening (11, 12) and the housing (10, 20) has an outer wall (23), which has an outlet opening (21), through which liquid possibly contained in the housing (10, 20) can be discharged to the outside region (2).

19 Claims, 4 Drawing Sheets

(56) References Cited

U.S. PATENT DOCUMENTS

2011/0266375 A1* 11/2011 Ono ................... B60S 1/0848
239/589
2014/0085467 A1* 3/2014 Barthel ................ B60R 11/04
348/148

* cited by examiner

DEVICE HAVING A CAMERA UNIT AND A DOUBLE-WALLED HOUSING

The invention relates to a device with a camera unit, which is used to record images of the outside region of a motor vehicle with a housing, in which the camera unit is movably arranged, a protective element, which can be moved between an open position and a closed position, wherein the camera unit assumes an idle position in the closed position of the protective element, in which idle position the camera unit is located behind the protective element and thus is inaccessible from the outside region and the camera unit is located in the active position for recording images in the open position of the protective element. Further, the invention relates to a method for mounting a device, which serves for image recording of the outside region of a motor vehicle.

The use of camera units for vehicle environment registration is already known. Such camera units are for example used in motor vehicles as parking aid and/or manoeuvring systems in order to particularly recognize the regions around the vehicle, which are not visible with conventional mirrors of the motor vehicle. From the state of the art it is known that the camera unit can take an idle position, in which no image recording occurs. Further, the camera unit can take an active position in order to register the vehicle environment. Normally the camera unit extends in this active position, which occurs via a drive, which is in an operative connection with the camera unit. Disadvantageously, it has been shown that particularly in the active position of the camera unit fluid, particularly moisture, can penetrate into the housing of the camera unit. This is particularly the case when the camera unit is assembled inclined regarding the stand space of the motor vehicle. Disadvantageously, in such cases fluid, particularly rain water, is collected within the camera housing, which often can't drain off properly.

It is the object of the present invention to avoid the previously described disadvantages, particularly to generate a device, which avoids the collection of fluid within the housing of the camera unit. Further, a device with a camera unit should be established, whose assembly is easy to mount and constitutes a compact unit.

The objection of the present invention is solved by all features of the independent claim 1. In the dependent claims preferred embodiments are described.

According to the invention the housing is at least partially configured double-walled in a way that the housing comprises an inner wall with at least one opening and the housing comprises an outer wall, which is configured with an outlet opening, wherein possible fluid within the housing can be transported to the outside region. It is particularly essential for the invention that the housing of the camera unit is configured for reliably leading incoming fluid from the outside away in order to avoid possible dysfunctions. The opening of the inner wall serves for letting drain off possible penetrating fluid in the direction of the outer wall. Further, the outer wall is adjusted to the outlet opening in a way that the fluid can easily drain in that direction and therewith can get out of the device according to the invention. A significant advantage of the double-wall of the housing is that via the outer wall the outlet location of the fluid is defined specifically, which can be important in the overall construction of the motor vehicle. The inner wall of the housing can comprise multiple openings, which are able to let possible fluid out in the direction to the outer wall. The device according to the invention can include that the inner wall and the outer wall are part of the common housing, which is in its overall construction particularly monolithic and/or configured in one piece. Likewise, the invention comprises that the inner wall and the outer wall are configured from two different housing parts, which can be assembled to one another during mounting.

Further, the invention can include that the housing comprises an inner housing and an outer additional housing assembled towards the inner housing, wherein the inner housing is configured with the inner wall and the additional housing comprises the outlet opening. The additional housing can at least comprise at the inner housing defined areas, wherein advantageously the camera unit is movably arranged in the inner housing. The additional housing and the inner housing are configured from a plastic material, wherein advantageously the inner housing is from polyamide. Advantageously, the inner housing is glass fibre reinforced, wherein the proportion of glass fibre reinforcement is advantageously 20% to 40%, particularly 30%, according to the weight proportion. Since forces act on the housing during the movement of the camera unit, particularly to the inner housing, the previously described reinforced plastic is an advantage. The reinforcement of the plastic can be effected by further material alternatives particularly by the addition of carbon material.

In order that the fluid can reliably drain off into the direction of the outlet opening, in a possible embodiment of the device according to the invention the outer wall can be configured funnel-like in the area facing the outlet opening.

A measure improving the invention can intend that the opening of the inner wall is assembled above the outlet opening according to the stand space of the motor vehicle. Hereby, it is effected that fluid within the housing can drain off on the one hand through the opening of the inner wall. On the other hand the position of this opening, which is above the outlet opening is variable according to the geometry of the inner housing. It is advantageous that at the positions, at which fluid is preferably generated within the inner housing also the corresponding openings occur, which enable a drain off of the fluid into the direction of the outer wall.

The device, according to the invention can comprise that in the closed position the protective element is adjusted inclined towards the stand space of the motor vehicle, particularly that the protective element is adjusted in an angle a towards the stand space, which is between $10°\leq\alpha\leq80°$ preferably between $30°\leq\alpha\leq70°$. The inclined position of the protective element in its closed position is often caused by the geometric configuration of the car body particularly in the rear end. Advantageously, a corresponding sealing is intended, which avoids a penetration of fluid, moisture or dirt particles, etc. in the housing. In the open position of the protective element however, fluid can penetrate into the housing, which is however, reliably guidable into the direction of the outlet opening due to the double-wall of the housing.

Advantageously, a tube body can be assembled at the outlet opening. The tube body can be configured from a rigid material. Likewise, it is possible that the material of the tube body is flexible and/or elastic so that the tube body can be assembled in any geometry within the motor vehicle. The tube body can advantageously be configured from plastic, particularly the tube body can be strengthened with an additional material, particularly the additional material can be configured from glass fibre, carbon fibre, etc.

The invention can further comprise that a protective element is intended that avoids a penetration of moisture from the outside region into the housing. The protective element can be assembled in the tube body, wherein particularly the protective element is a filter element and/or a valve element. The protective element has the function that no fluid, moisture, etc. from the outside region penetrates into the housing of the camera unit through the tube body. For example it is possible that during driving of the motor vehicle in the rear end a certain negative pressure occurs, which disadvantageously facilitates the penetration of fluid, moisture, etc. into the tube body. The protective element is configured in a way that only fluid, moisture, etc. can be transported from the housing towards the outside but not in the opposite direction. The filter element can for example be configured semipermeable, particularly can be inserted as a membrane within the tube body. Likewise, it is possible that this protective element can be configured as a check valve and therewith fulfils said function.

In a further embodiment improving the invention a support can be assembled at the housing, at which a drive unit is assembled for moving the camera unit, particularly that the support is between the housing and the drive unit. The support has the function to be able to attach the drive unit at its defined position at the housing, wherein the positioning of the drive unit occurs via the support. The assembly of the support and the housing and the drive unit can be sandwich-like. Hereby, a compact overall construction of the device according to the invention can be achieved, wherein at the same time an easy mounting can be achieved.

Further, the device can comprise a protective element with a protective element housing, wherein the protective element housing is between the housing of the camera unit and the protective element. The protective element is movably assembled at the protective element housing. The protective element housing can comprise fastening elements or fastening means, which serve for being able to assemble the device according to the invention at the motor vehicle. Not only the inner housing but also the protective element housing can comprise a penetration so that the camera unit can proceed into the active position in order to be able to configure an image recording in the rear end of the motor vehicle. The protective element housing can further comprise fastening interfaces for further elements, particularly electronic elements, which can be assembled at the protective element housing. For example the protective element housing can be assembled at the additional housing in a form and/or force fitting manner. In a possible embodiment of the device according to the invention first and second fastening means can be intended, which serve for the assembly of the protective element housing at the additional housing, wherein the first fastening means cause a form fit and the second fastening means cause a force fit. In a first mounting step the additional housing can be assembled at the protective element housing via the first fastening means, wherein in the second fastening step a final fixation of the protective element housing at the additional housing occurs, wherein the second fastening means can be reversibly detachable. Likewise, it can be intended that the first fastening means can be detached so that subsequently the additional housing can be removed from the protective element housing, particularly in case of repairing, maintenance, etc.

Further, the invention can intend that the outlet opening comprises a connecting element for attaching the tube body, wherein particularly the connecting element comprises protrusions at the surface area, which serve as fastening means for attaching the tube body. The protrusions of the connecting element serve for achieving a form fit between the tube body and the connecting element so that an undesired detaching of the tube body from the additional housing can be almost avoided.

Advantageously, the device according to the invention can comprise an inclined wall, which comprises the additional housing. The wall is assembled inclined toward the stand space of the motor vehicle so that possible fluid can drain off from the housing into the direction of the outlet opening.

Preferably, the protective element can at its outer side comprise a design element and/or an emblem. An emblem within the sense of the invention is particularly a sign for a vehicle mark, particularly an automobile mark. Thereby, the emblem can be configured two-dimensional or three-dimensional. The protective element can further comprise at least one optic display element, which for example can comprise a light source like a LED, etc. Hereby, different display functions, signal functions, information for the outside region of the vehicle can be generated.

The object of the present invention is further solved by a method according to all features of claim 15.

According to the invention a method for mounting a device, which serves for image recording of the outside region of a motor vehicle is intended with an inner housing in which a movable camera unit can be assembled, an additional housing, which at least area-wise comprises the inner housing, a support, which is assembled at the additional housing in a way that at the same time the inner housing is kept at the additional housing, wherein a drive unit, which serves for moving the camera unit is assembled at the support and at the inner housing in a way, that the support is between the additional housing and the drive unit and a housing composition is built, which is collectively assembled at a protective element housing for a movable protective element in that the additional housing is assembled via fastening means with the protective element housing. A particular advantage of this method is that a housing composition is configured, which for the installer can be assembled at the protective element housing without great mounting effort. Hereby, a compact overall assembly of the device according to the invention is established, which in turn can be assembled at defined fastening interfaces at the motor vehicle. In a possible embodiment of the invention the protective element housing can comprise corresponding fastening interfaces in order to achieve a reliable fastening effect at the motor vehicle, particularly at the rear end of the motor vehicle.

Further features and details of the invention result from the claims, the subsequent description and the drawings. In the drawings the invention is shown in multiple embodiments. Thereby, the features described in the claims and in the description can be essential for the invention each single for themselves or in any combination. It is shown:

Figure 1:
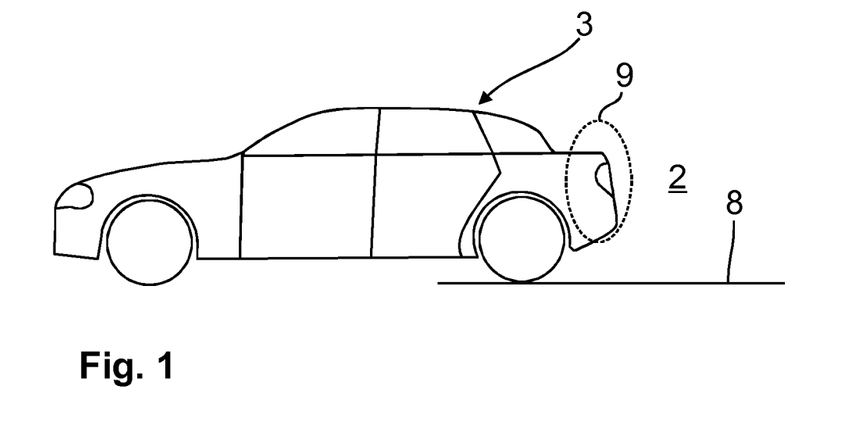
FIG. 1 a schematic view of a motor vehicle with a device for image recording of the outside region of a motor vehicle assembled in the rear end, FIG. 2 an only schematical drawing of a device with a camera unit for image recording of the outside region of the motor vehicle, FIG. 3 an exploded view of a housing for a camera unit according to FIG. 1 or FIG. 2, FIG. 4 a further embodiment of a device for image recording of the outside region of the motor vehicle, FIG. 5 a detailed view of a part of the housing from FIG. 3 and FIG. 6 an enlarged view according to the housing for a device for image recording of the outside region of a motor vehicle according to FIG. 4.
Figure 2:
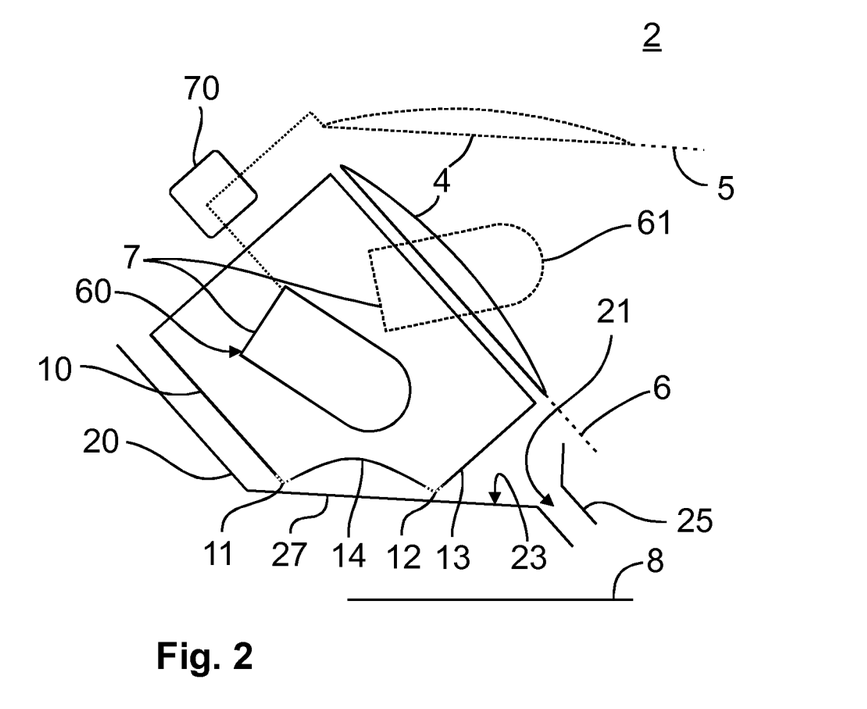

In FIG. 1 a motor vehicle 3 is shown, which comprises a device for image recording of the outside region 2 of the motor vehicle 1 in the rear end 9. In FIG. 2 a schematic drawing of a possible embodiment of the device for image recording of the outside region 2 of the motor vehicle 3 is shown. Hereby, the device comprises a camera unit 7, which is movably assembled within the housing 10, 20. The device according to the invention comprises a protective element 4, which can be moved between an open position 5 and a closed position 6. In the closed position 6 of the protective element 4 the camera unit 7 assumes an idle position 60 in which the camera unit 7 is inaccessible from the outside region 2 behind the protective element 4. In the open position 5 of the protective element 4 the camera unit 7 is in the active position 61 in order to perform an image recording of the outside region 2.

According to FIG. 2 the housing 10, 20 is configured partly with a double-wall. Hereby, the housing 10, 20 comprises an inner wall 13 and an outer wall 23. In the present embodiment the inner wall 13 comprises multiple openings 11, 12, which serve for allowing the particularly penetrating fluid to drain out from the housing 10, 20. Fluid can for example penetrate into the housing 10, 20 in case the camera unit 3 is in the active position 61 and therewith the protective element 4 adopts its open position 5. In the closed position 6 of the protective element 4 the housing 10, 20 is reliably sealed so that it is impossible that fluid can penetrate from the outside region 2 into the housing 10, 20. For example it is possible that a sealing between the protective element 4 and the housing 10, 20 is assembled in a way that in the idle position 60 the camera unit 7 is reliably protected from outer environmental influences.

In case fluid is collected during the image recording of the outside region 2 within the housing 10, 20, the openings 11, 12 serve for the fact that the fluid can reach into the direction of the outer wall 23 and that due to the geometry of the outer wall 23 the fluid can be transported into the direction of an outlet opening 21 of the outer wall 23 towards the outside region 2.

According to the assembly situation and the geometric properties within the rear end of the motor vehicle 3 it is possible that the inner wall 13 is equipped with only one opening or with more than two openings in order to let the fluid reliably drain off from the housing 10.

According to the shown embodiment according to FIG. 3 to FIG. 6 the housing 10, 20 is configured from two single housing parts meaning from one inner housing 10, which is at least partially covered by an outer additional housing 20. Hereby, the double-wall is reached. The inner housing 10 is configured with said inner wall 13 and the additional housing 20 is configured with the outlet opening 21. Like shown in FIG. 2 to FIG. 5 the outer wall 23 of the additional housing 20 is configured funnel-like in the area facing the outlet opening 21 so that fluid can reliably drain off from the housing 10, 20.

Figure 4:
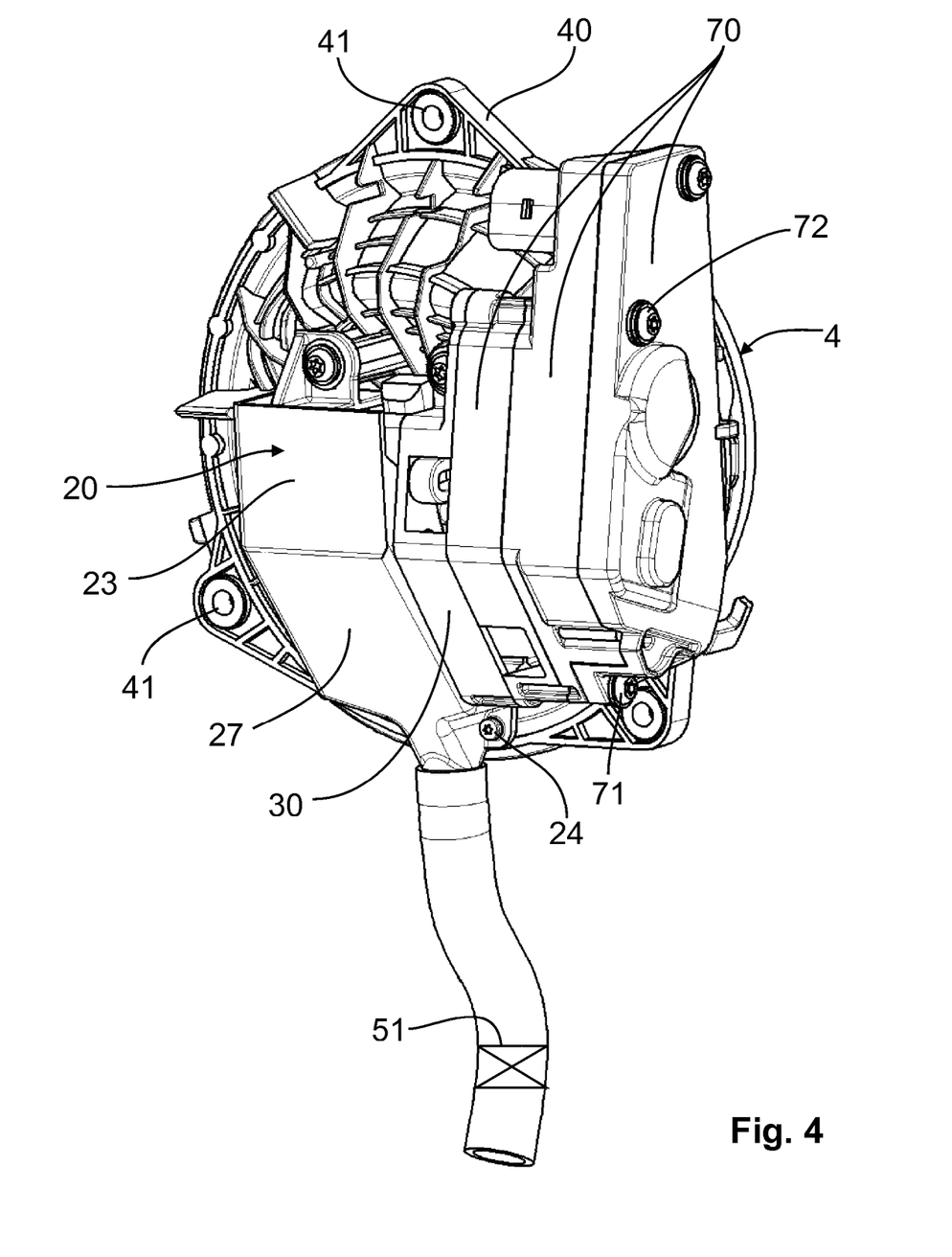
Figure 5:
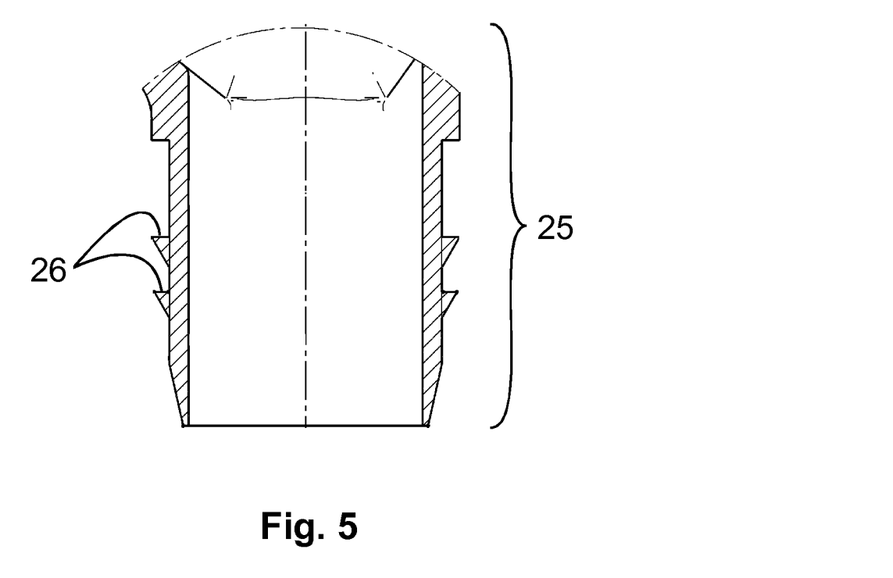
Figure 6:
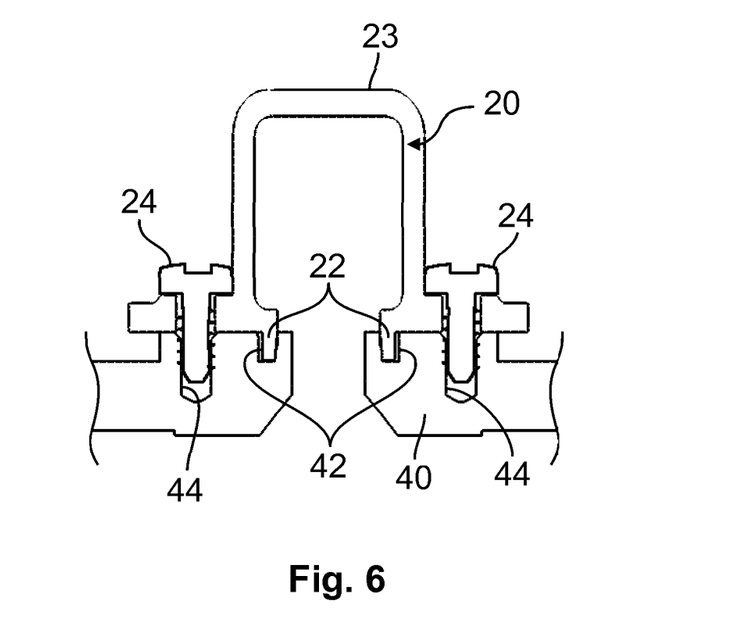

The openings 11, 12 of the inner housing 10 are assembled above the outlet opening 21 according to the stand space 8 of the motor vehicle 3 (see FIG. 1). Therewith, it is ensured that fluid can drain from the inner housing 10 into the additional housing 20 in the direction of the outlet opening 21. In FIG. 2 it is intended that the device for image recording of the outside region 2 of the motor vehicle 3 is assembled inclined at the rear end. This means that in the closed position 6 the protective element 4 is adjusted diagonally towards the stand space 8 of the motor vehicle 3. In the open position 5 of the protective element 4 the chance is increased that during rain fluid can penetrate into the housing 10, 20. In order to reliably transport fluid out of the motor vehicle 3 a tube body 50 is assembled at the outlet opening 21, which is shown in FIG. 4. According to the geometry and the assembly conditions within the motor vehicle a tube body 50 can be individually adjusted.

In FIG. 4 further the possibility is shown that a security element 51 can be intended within the device according to the invention for image recording of the outside region 2, wherein the security element 51 avoids the penetration of fluid from the outside region 2 into the housing 10, 20, particularly in the closed position 6 of the protective element 4. For example it is possible that during driving a certain negative pressure can be adjusted in the rear end of the motor vehicle 3, wherein in an undesired manner moisture can penetrate through the tube body 50 into the housing 10, 20. For example it is possible that a filter element or a valve element can be used as a security element 51. For example a semipermeable membrane is possible as a security element 51 or also a non-return valve. All embodiments for the security element 51 enable that fluid can penetrate through the tube body 50 towards the outside region 20 but not vice versa.

In order to move the camera unit 7 between the idle position 60 and the active position 61 a drive unit 70 is intended, which is schematically shown in FIG. 2. The drive unit 70 comprises an electric motor, which is in an operative connection with the camera unit 7 and/or the protective element 4. Hereby different kinematics, mechanisms etc. are possible in order to adjust the camera unit 7 and the protective element 4 in the respective status or position. In FIG. 4 a possible embodiment is shown, which in a compact manner enables to assemble the drive unit 70 at the housing 10, 20 via a support 30. Previous to the assembly of the drive unit 70 according to FIG. 3 a fixation of the additional housing 20 at the inner housing 10 occurs meaning that a not explicitly shown fastening means is guided through the upper penetration 28 of the additional housing 20 and through a fastening opening 18 of the inner housing 10 and therewith to effect a reliable fixation of both housing parts 10, 20.

Subsequently, the support 30 is guided with a drive unit 70 at the housing composition 10, 20, wherein a fastening means, particularly a screw 71, is used, which penetrates through the drive unit 70, the support 30, through the penetration 29 of the additional housing 20 and through the fastening opening 19 of the inner housing 10. A further fastening means 62, particularly a screw, effects a further fixation of the drive unit 70 with the support 30. If the housing composition is assembled from an inner housing 10, the additional housing 20, the support 30 and the drive unit 70, a fastening of this housing composition occurs with a protective element housing 40 of a protective element 4, see FIG. 4. The protective element housing 40 is positioned between the housing 10, 20 of the camera unit 7 and the protective element 4. The fixation of the previously described housing group occurs only via the additional housing 20, wherein the fastening occurs via a first fastening means 22, 42 and a second fastening means 24, 44. According to FIG. 6 the first fastening means 22 of the additional housing 20 is configured protrusion-like, wherein the fastening means 22 engages in a corresponding groove 42 of the protective element housing 40 in a form-fitting manner. In order to constantly secure the fastening state between the additional housing 20 and the protective element housing 40 a final fixation via the second fastening means 24, here screw element, occurs, which can penetrate in a corresponding recess 44 in the protective element housing 40. The first fastening means 22, 42 configure a form fit between the additional housing 20 and the protective element 40. The second fastening means 24, 44 further configure that a force-fit occurs between both housing parts 20, 40.

Figure 3:
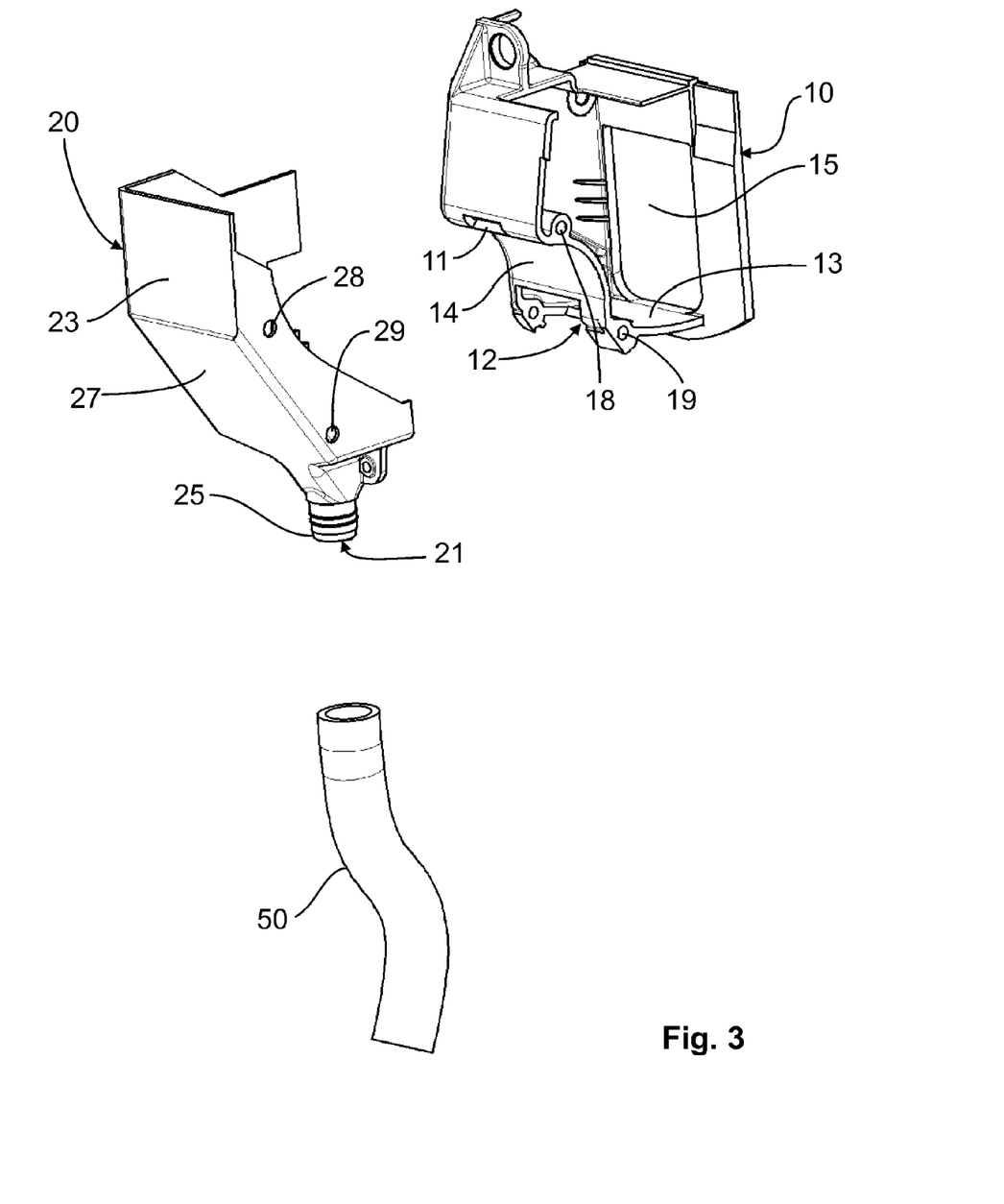

In FIG. 3 it is shown that the additional housing 20 comprises an inclined wall 27, which is inclined according to the stand space 8 according to FIG. 1 so that possible fluid can drain off into the direction of the outlet opening 21. Further, it is shown in FIG. 3 that the inner housing 10 comprises an area within the inner wall 13, which comprises reinforcement properties. The area 14 of the inner wall 13 is curved towards the inside particularly into the direction of the camera unit 7, wherein an overall construction of the inner housing 10 is reinforced. All housing parts 10, 20, 40 and housing parts of the drive unit 70 are made from plastic, particularly polyamide. The plastic can be strengthened according to special requirements for example via an addition of glass fibres, carbon fibres etc.

In order to reliably assemble the tube body 50 at the housing 10, 20 the outlet opening 21 comprises a connecting element 25, at which the tube body 50 is fixed. The connecting element 25 is configured with protrusions 26 at its surface area, which serve as fastening means for a reliable fixation of the tube body 50. These protrusions 26 are shown in an enlarged view in FIG. 5. The protrusions 26 mainly serve for the fact that the tube body 50 is not undesiredly detached from the connecting element 25.

According to FIG. 4 further a device according to the invention is shown in a completely assembled state, which can subsequently be assembled at the motor vehicle or at the motor vehicle body. Therefor the protective element housing 40 comprises fastening interfaces 41, which enable an easy mounting of the protective element housing 40 at the motor vehicle. In the present embodiment the fastening interfaces 41 are configured as penetrations or openings through which for example screw elements can be guided.

REFERENCE LIST

2 Outside region
3 Motor vehicle
4 Protective element
5 Open position
6 Closed position
7 Camera unit
8 Stand space
9 Rear end
10 Inner housing
11 First opening
12 Second opening
13 Inner wall
18 Fastening opening
19 Fastening opening
20 Additional housing
21 Outlet opening
22 First fastening means
23 Outer wall
24 Second fastening means
25 Connecting element
26 Protrusion
27 Inclined wall
28 Penetration
30 Support
40 Protective element housing
41 Fastening interface
42 First fastening means
44 Second fastening means
50 Tube body
51 Security element
60 Idle position
61 Active position
62 Fastening means, screw
70 Drive unit
71 Fastening means, screw
72 Fastening means, screw

The invention claimed is:

1. A device with a camera unit, which serves for image recording of an outside region of a motor vehicle, comprising a housing, the camera unit is movably assembled within the housing,
   a protective element configured to be moved between an open position and a closed position, wherein
   in the closed position of the protective element the camera unit assumes an idle position, in which the camera unit is inaccessible from the outside region behind the protective element,
   in the open position of the protective element the camera unit is in an active position for image recording,
   the housing is configured at least partially double-walled the housing comprises an inner wall with at least one opening and the housing comprises an outer wall, the outer wall having an outlet opening, wherein the housing is structured to allow received fluid to flow from the at least one opening of the inner wall to the outlet opening of the outer wall to the outside region.

2. The device according to claim 1,
   wherein
   the housing comprises an inner housing and an outer additional housing, the outer additional housing is assembled towards the inner housing, wherein the inner housing is configured with an inner wall and the outer additional housing comprises the outlet opening.

3. The device according to claim 1,
   wherein
   the outer wall is configured in a funnel shape in an area facing the outlet opening.

4. The device according to claim 1,
   wherein
   the opening of the inner wall is assembled above the outlet opening according to a stand space of the motor vehicle.

5. The device according to claim 1,
   wherein
   in the closed position the protective element is adjusted inclined towards a stand space of the motor vehicle.

6. The device according to claim 1,
   further comprising
   a tube body assembled at the outlet opening.

7. The device according to claim 1,
   further comprising a security element, the security element avoids a penetration of moisture from the outside region into the housing.

8. The device according to claim 7,
   wherein
   the security element is assembled in the tube body.

9. The device according to claim 1,
   further comprising
   a support assembled at the housing, a drive unit is assembled at the support for moving the camera unit.

10. The device according to claim 1,
    wherein the protective element comprises a protective element housing, wherein the protective
element housing is between the housing of the camera unit and the protective element.

11. The device according to claim 10,
wherein the housing comprises an inner housing and an outer additional housing, the outer additional housing is assembled towards the inner housing, the inner housing is configured with an inner wall and the outer additional housing comprises the outlet opening and wherein
the protective element housing is assembled at the outer additional housing at least in a form or force-fitting manner.

12. The device according to claim 10,
further comprising a first fasting means and a second fastening means for the assembly of the protective element housing at the additional housing, wherein the first fastening means effect a form fit and the second fastening means effect a force fit.

13. The device according to claim 6,
wherein
the outlet opening comprises a connecting element for assembly of the tube body.

14. The device according to claim 1,
wherein
the additional housing is configured with an inclined wall towards a stand space so that possible fluid can drain off into the direction of the outlet opening.

15. A method for mounting a device, which serves for image recording of the outside region of a motor vehicle, comprising
providing an inner housing, in which a movable camera unit is mounted,
providing an outer additional housing, at least partially covering the inner housing,
providing a support assembled at the outer additional housing, for supporting the inner housing and the additional housing, and
providing a drive unit for moving the camera unit assembled at the support and at the inner housing in a way that the support is between the outer additional housing and the drive unit, a protective element housing for a movable protective element, the outer additional housing is assembled with the protective element housing via fastening means, wherein
the housing comprises an inner wall with at least one opening and the housing comprises an outer wall, the other wall having an outlet opening, wherein the housing is structured to allow received fluid to flow from the at least one opening of the inner wall to the outlet opening of the outer wall to the outside region.

16. The device according to claim 5,
wherein
the protective element is adjusted in an angle a towards the stand space, which is between $10°\leq\alpha\leq80°$, preferably between $30°\leq\alpha\leq70°$.

17. The device according to claim 8,
wherein
the security element is at least a filter element or a valve element.

18. The device according to claim 9,
wherein
the support is between the housing and the drive unit.

19. The device according to claim 13,
wherein
the connecting element comprises protrusions at a surface area, which serve as fastening means for the assembly of the tube body.

* * * * *